(12) United States Patent
Esaki

(10) Patent No.: US 8,528,354 B2
(45) Date of Patent: Sep. 10, 2013

(54) VEHICLE AIR-CONDITIONING SYSTEM

(75) Inventor: Hidenori Esaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 775 days.

(21) Appl. No.: 12/265,980

(22) Filed: Nov. 6, 2008

(65) Prior Publication Data
US 2009/0113913 A1 May 7, 2009

(30) Foreign Application Priority Data

Nov. 6, 2007 (JP) ................................ 2007-287970

(51) Int. Cl.
*B60H 1/32* (2006.01)
*F25B 13/00* (2006.01)

(52) U.S. Cl.
USPC ................................ 62/239; 62/244; 62/324.6

(58) Field of Classification Search
USPC ......................................... 62/239, 244, 324.6
See application file for complete search history.

(56) References Cited

U.S. PATENT DOCUMENTS

| | | | | |
|---|---|---|---|---|
| 5,299,431 A * | 4/1994 | Iritani et al. | | 62/243 |
| 5,975,191 A * | 11/1999 | Ohashi et al. | | 165/43 |
| 6,079,218 A * | 6/2000 | Ueda | | 62/160 |
| 6,347,528 B1 * | 2/2002 | Iritani et al. | | 62/324.6 |
| 6,430,951 B1 * | 8/2002 | Iritani et al. | | 62/229 |
| 2003/0164001 A1 * | 9/2003 | Vouzelaud et al. | | 62/244 |
| 2004/0003608 A1 * | 1/2004 | Takeuchi et al. | | 62/170 |
| 2005/0132731 A1 * | 6/2005 | Nakamura et al. | | 62/160 |
| 2005/0172662 A1 * | 8/2005 | Matsumoto et al. | | 62/470 |
| 2006/0156745 A1 * | 7/2006 | Ikegami et al. | | 62/170 |
| 2006/0266072 A1 * | 11/2006 | Takeuchi et al. | | 62/500 |
| 2007/0163293 A1 * | 7/2007 | Ikegami et al. | | 62/500 |
| 2007/0209779 A1 * | 9/2007 | Shinmura et al. | | 165/42 |
| 2009/0113913 A1 * | 5/2009 | Esaki | | 62/239 |
| 2011/0167849 A1 * | 7/2011 | Kobayashi et al. | | 62/159 |

FOREIGN PATENT DOCUMENTS

| | | |
|---|---|---|
| JP | 6-135219 | 5/1994 |
| JP | 6-135221 | 5/1994 |
| JP | 6-341732 | 12/1994 |
| JP | 06-341732 | * 12/1994 |
| JP | 06341732 | * 12/1994 |
| JP | 7-13526 | 3/1995 |

(Continued)

OTHER PUBLICATIONS

Japanese Notification of Reasons for Rejection for Application No. 2007-287970, dated Mar. 9, 2010.

(Continued)

*Primary Examiner* — Frantz Jules
*Assistant Examiner* — Henry Crenshaw
(74) *Attorney, Agent, or Firm* — Nelson Mullins Riley & Scarborough LLP; Anthony A. Laurentano

(57) ABSTRACT

The present invention provides a vehicle air-conditioning system in which an air for air-conditioning is cooled at a first evaporator, is heated at a condenser, and is supplied to a vehicle interior in heating operation. The object of the present invention is to suppress a dew condensation at the first evaporator to prevent a freeze of the dew condensation water even if the temperature of the air for air-conditioning introduced from the outside of the vehicle is low. The above object is achieved by disposing a second evaporator between an automated expansion valve to decompress the refrigerant exhausted from a compressor and the first evaporator so as to reduce the absorbed heat at the first evaporator.

14 Claims, 9 Drawing Sheets

(56) References Cited

FOREIGN PATENT DOCUMENTS

| JP | 07-013526 | * | 3/1995 |
| JP | 07013526 | * | 7/1995 |
| JP | 10-100662 | | 4/1998 |
| JP | 2992779 B2 | | 12/1999 |
| JP | 2001-30742 | | 2/2001 |
| JP | 2007-40690 | | 2/2007 |

OTHER PUBLICATIONS

Japanese Office Action for Application No. 2007-287970, dated Aug. 18, 2009.

* cited by examiner

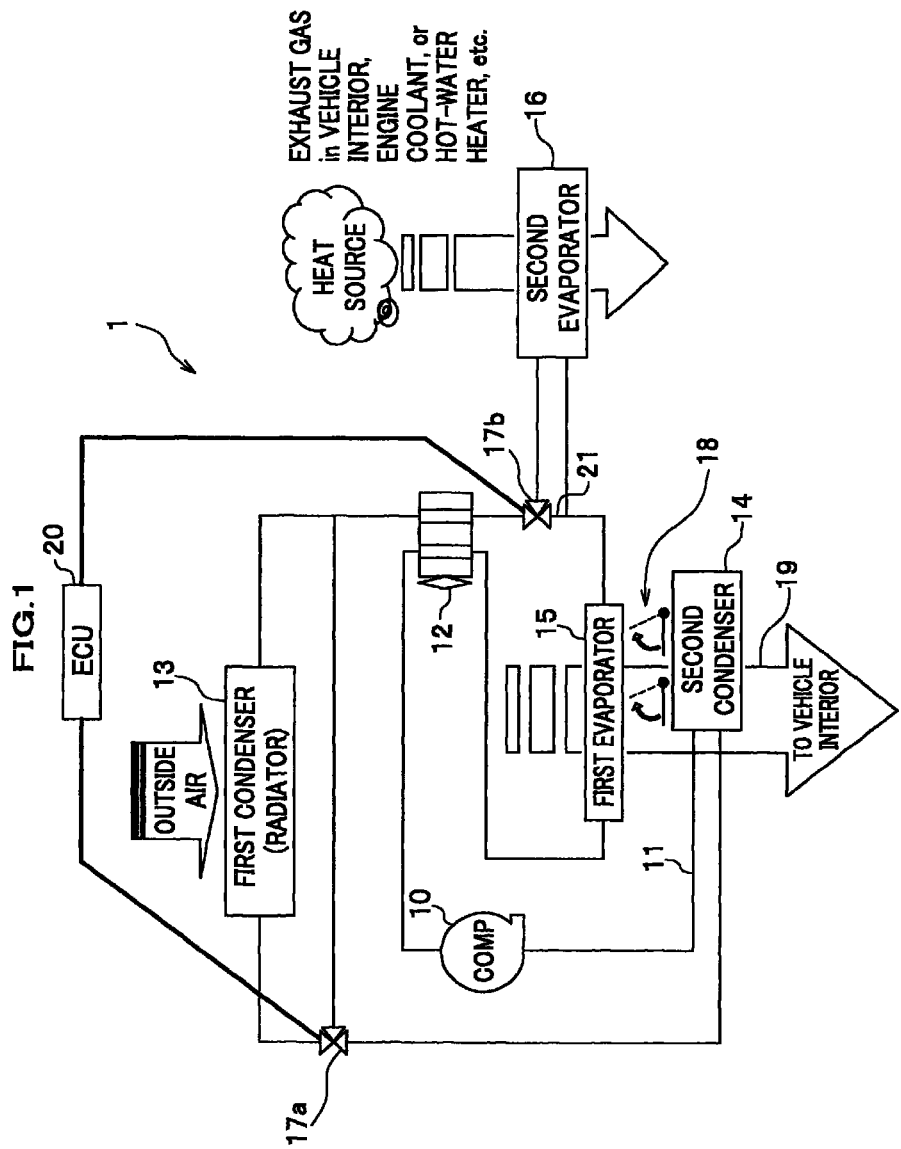

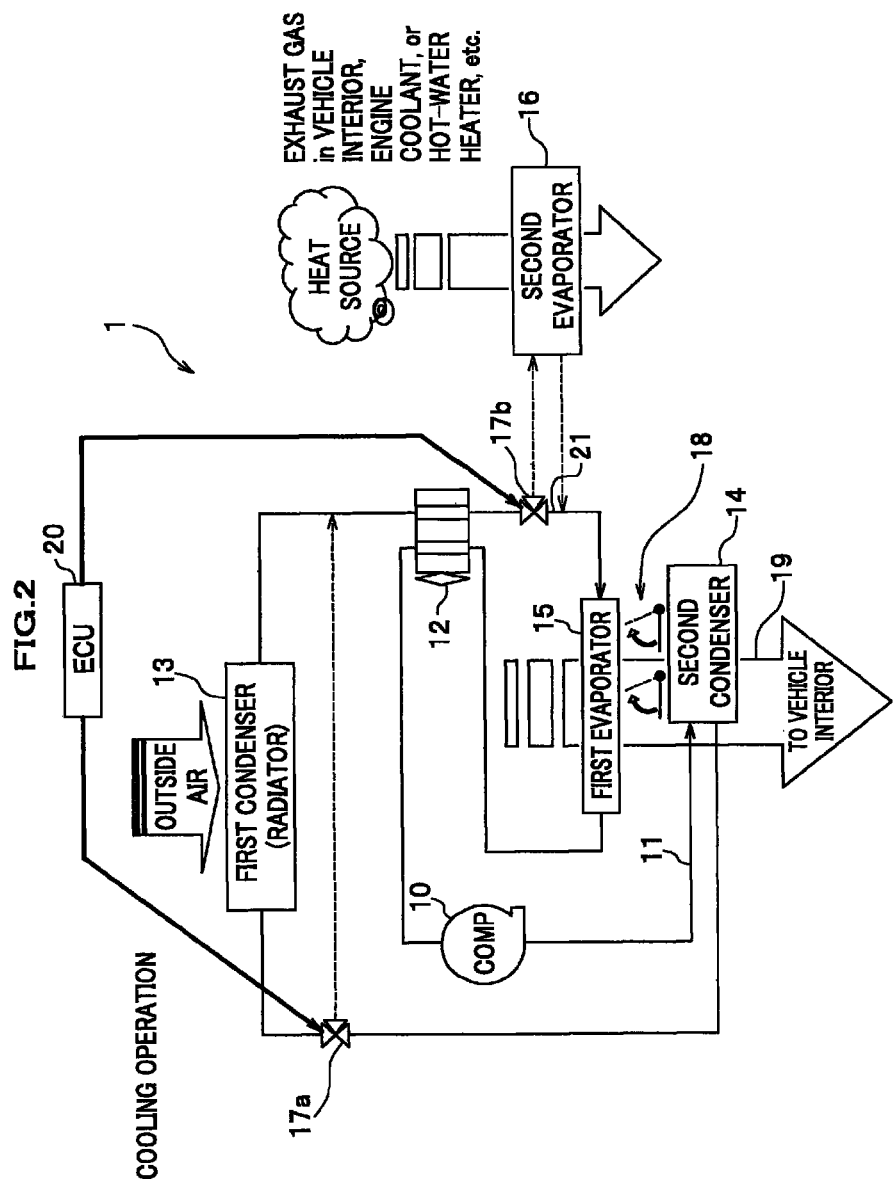

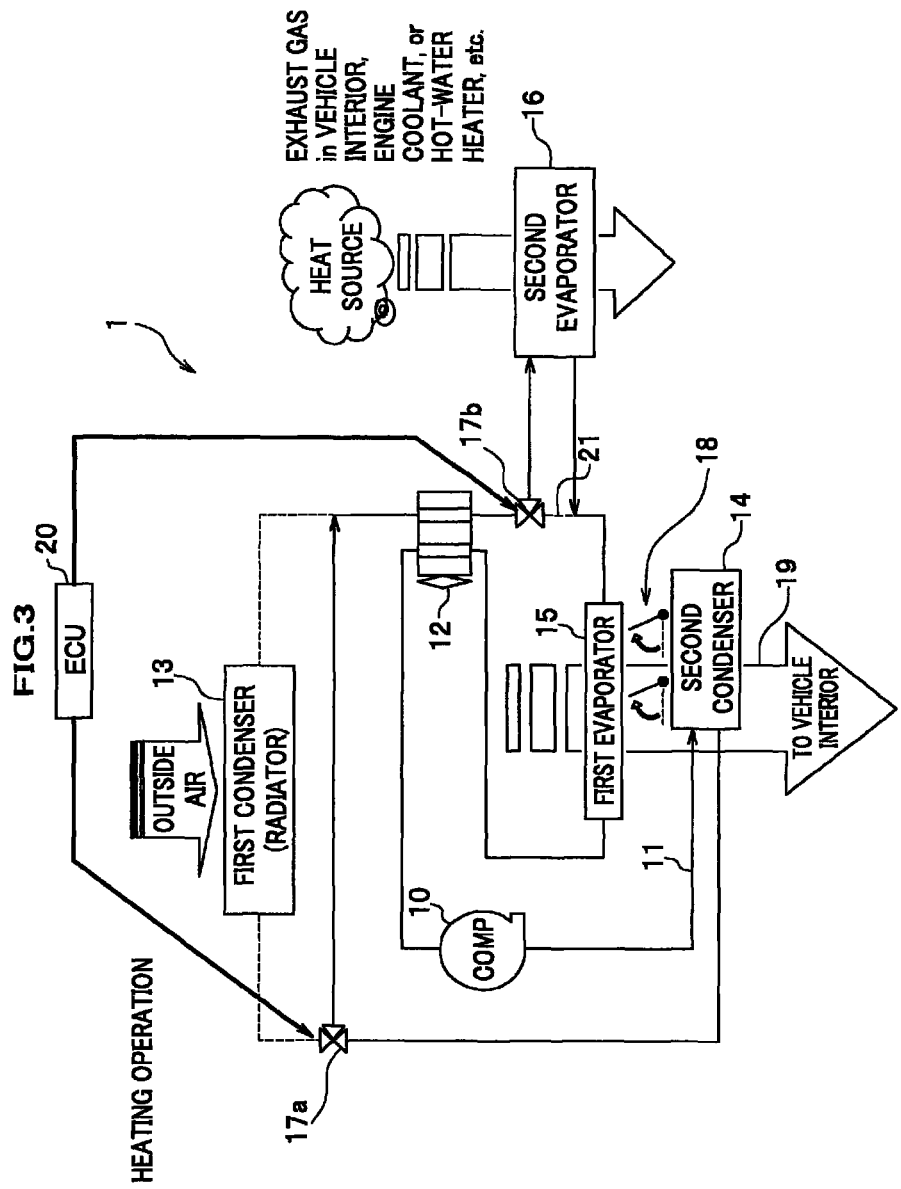

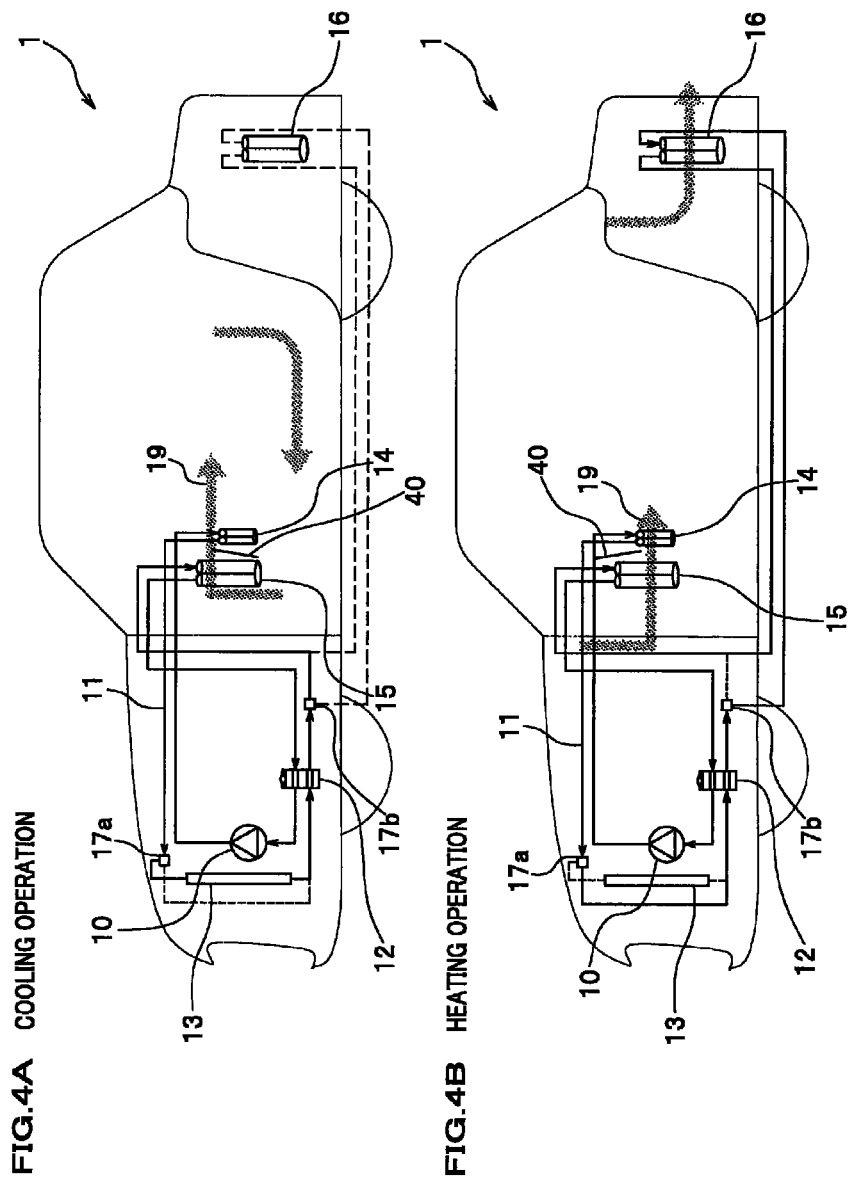
FIG.4A COOLING OPERATION
FIG.4B HEATING OPERATION

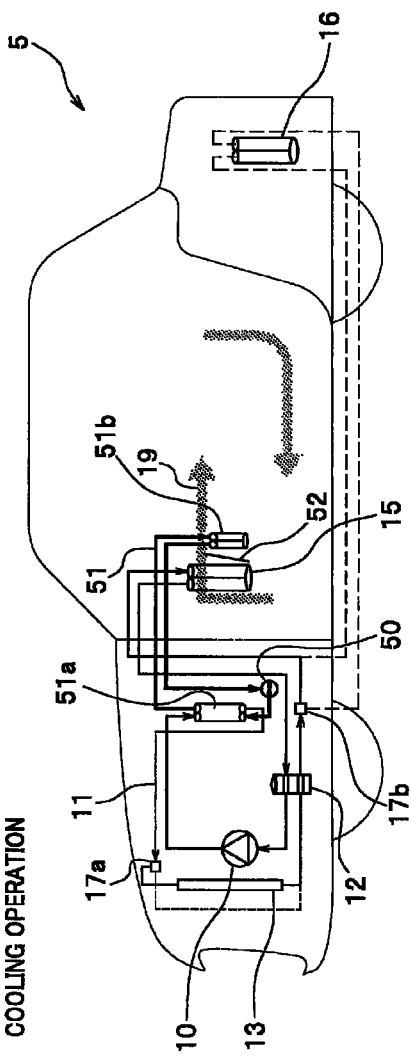
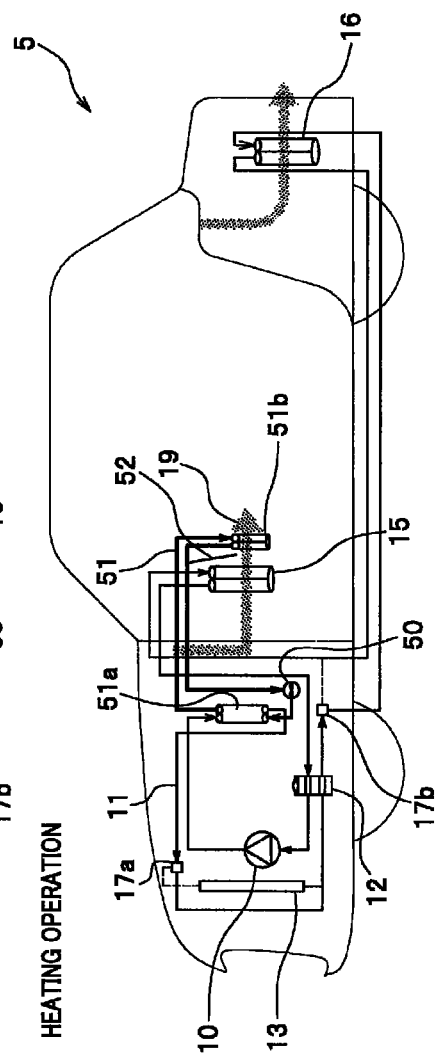
FIG.5A COOLING OPERATION
FIG.5B HEATING OPERATION

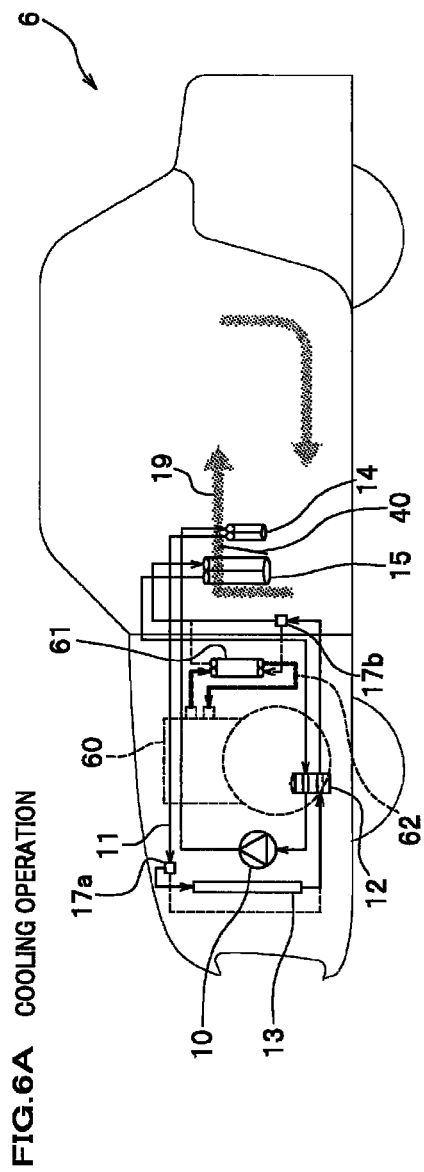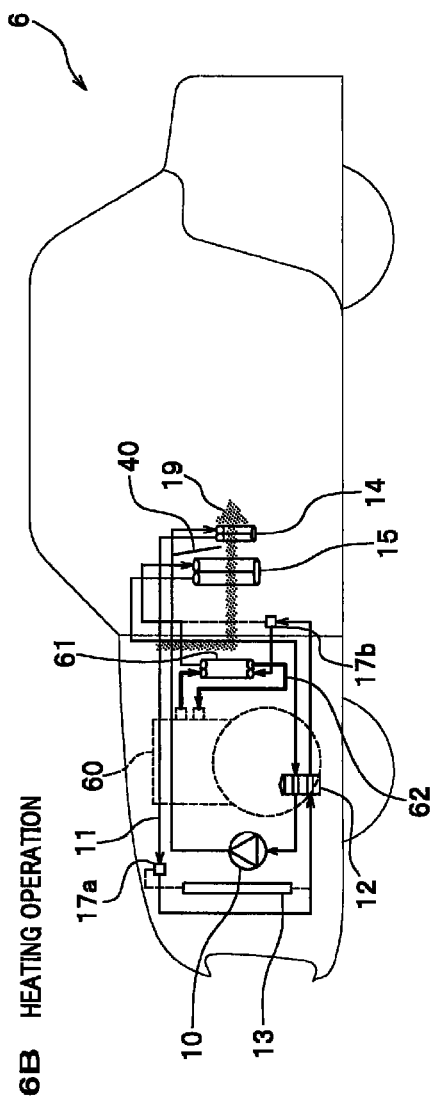
FIG.6A COOLING OPERATION
FIG.6B HEATING OPERATION

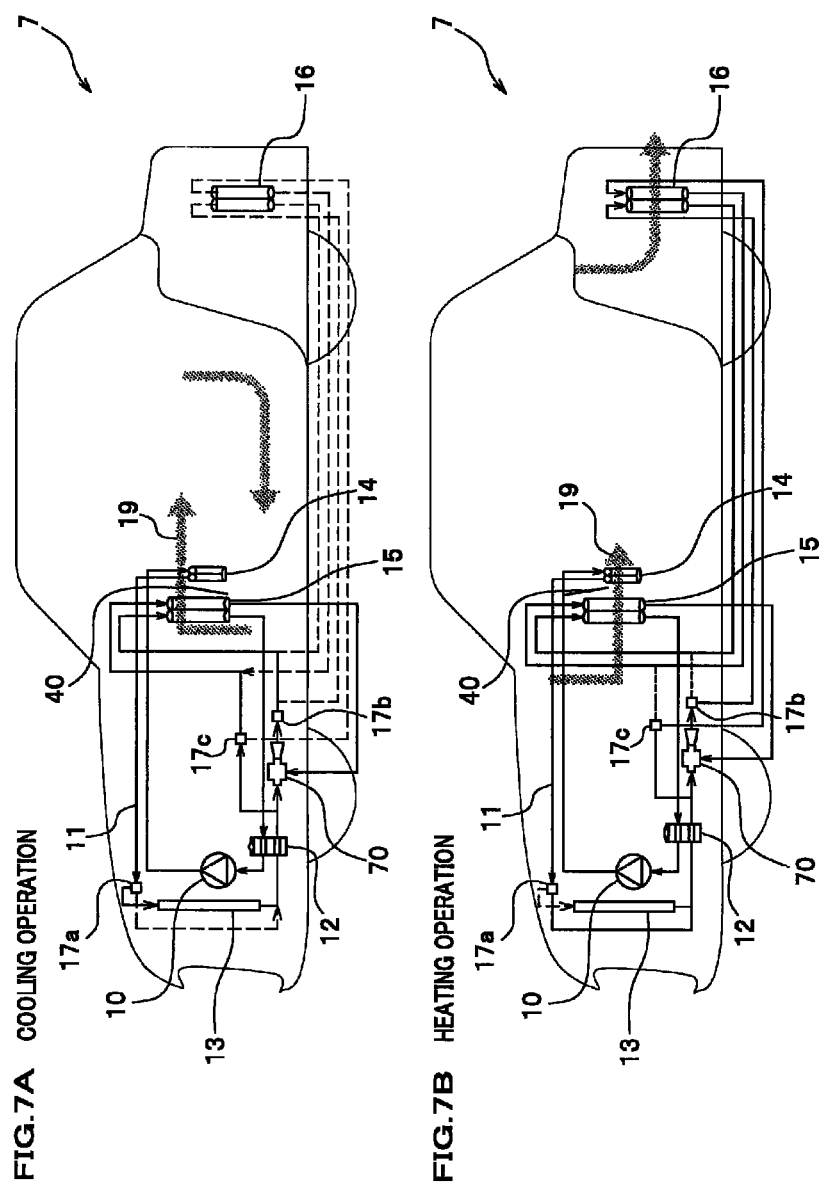

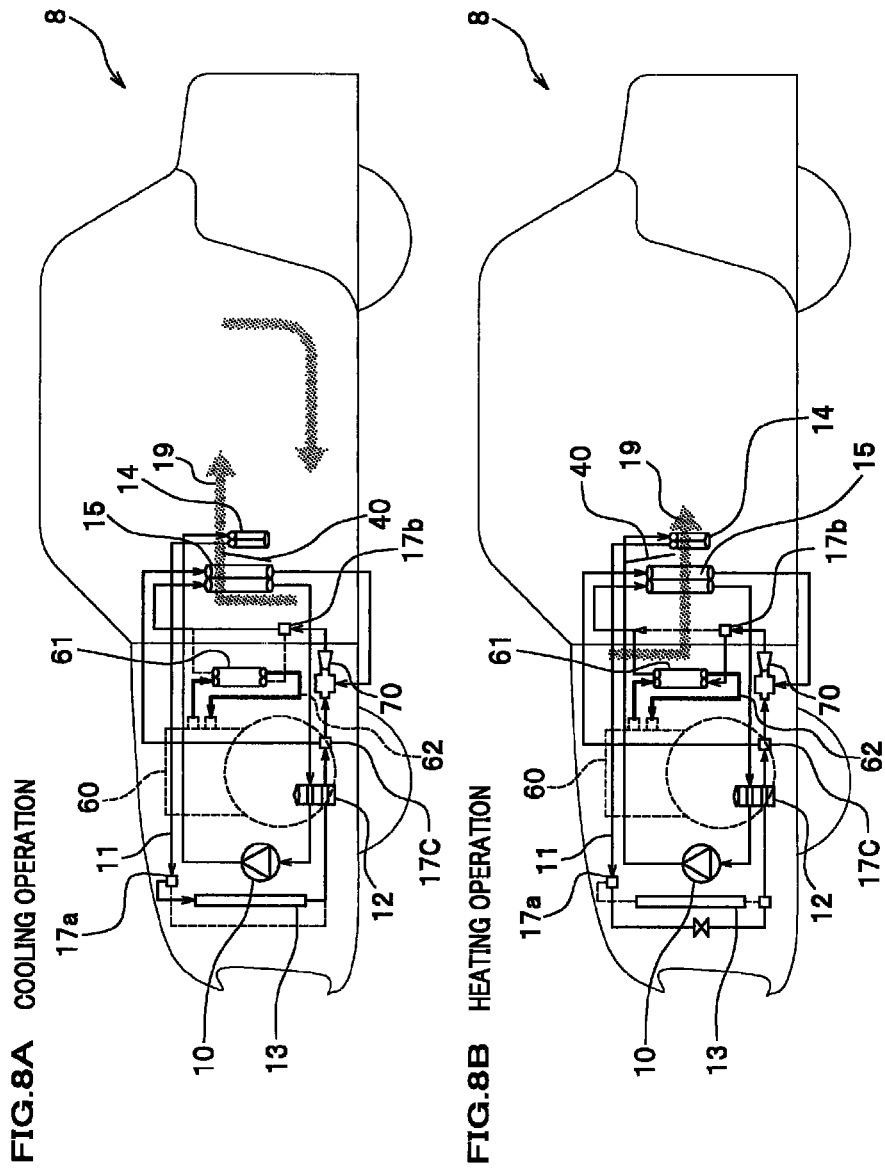
FIG.8A COOLING OPERATION
FIG.8B HEATING OPERATION

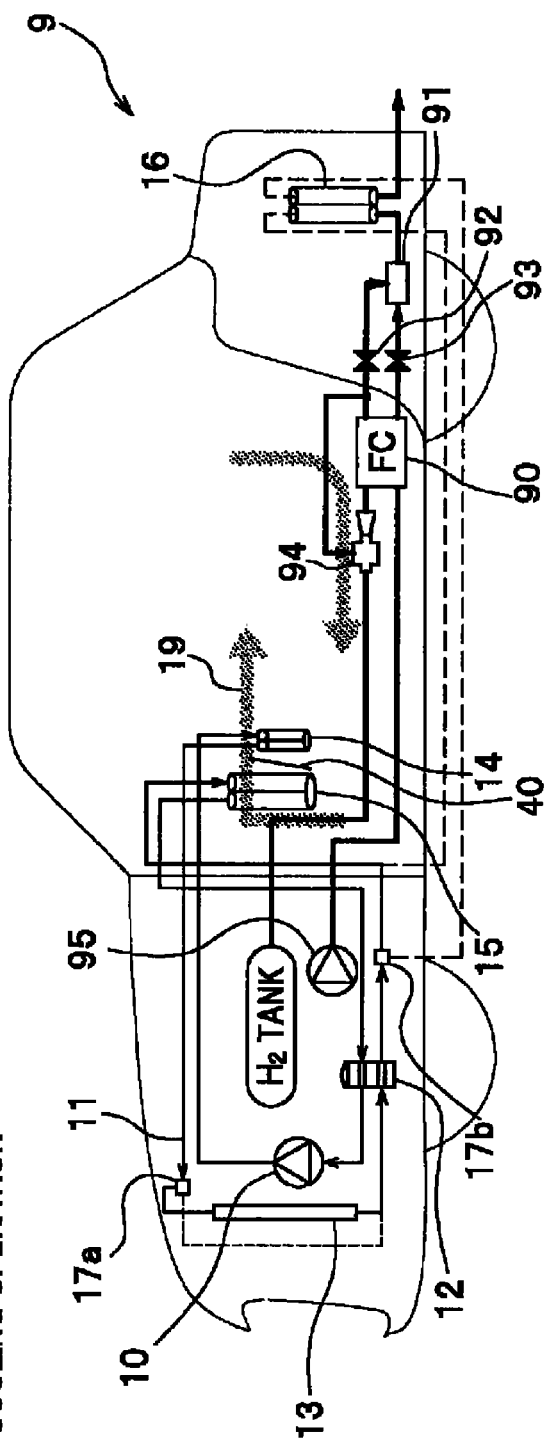
FIG.9A COOLING OPERATION
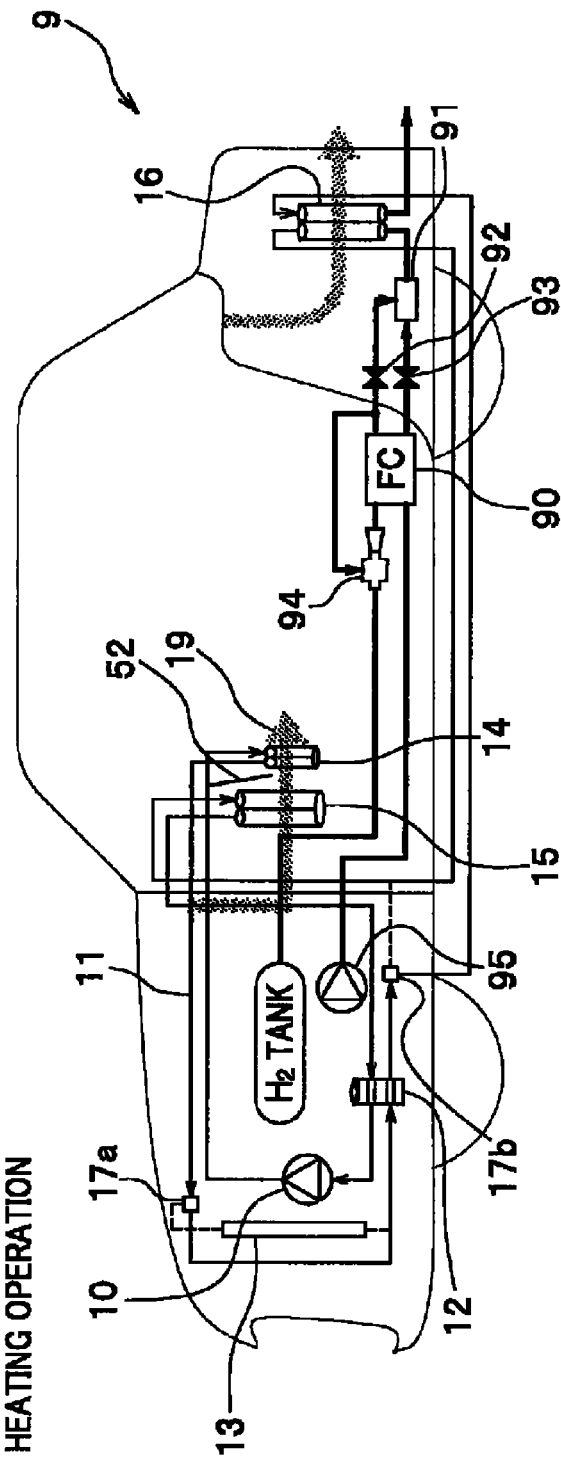
FIG.9B HEATING OPERATION

VEHICLE AIR-CONDITIONING SYSTEM

CROSS REFERENCE TO RELATED APPLICATIONS

The present application claims benefit of the filing date of Japanese Patent Application No. 2007-287970 filed on Nov. 6, 2007 which is incorporated herein by reference.

FIELD OF THE INVENTION

The present invention relates to suppression of dew condensation in heating operation of a vehicle air-conditioning system.

DESCRIPTION OF THE RELATED ART

As a prior art vehicle air-conditioning system, JP 2992779 B2 discloses a vehicle air-conditioning system in which an air-conditioning operation is changed between cooling operation and heating operation by actuating a four-way valve so as to reverse a flow direction of a refrigerant in a pipe and to reverse roles of an evaporator (heat exchanger for heat-absorbing) and a condenser (heat exchanger for heat-radiating) (see [0016]-[0020]). In this vehicle air-conditioning system, the refrigerant is circulated by expanding a high-pressure gas discharged from a compressor with an electric expansion valve and by introducing the gas into the compressor again after absorbing heat from an air for air-conditioning at the evaporator or radiating heat to the air for air-conditioning at the condenser. Therefore, the refrigerant is kept at high pressure until the refrigerant is expanded by the electric expansion valve, and requires all pipes to be pressure-resistant (e.g., radially thick) because the flow direction of the refrigerant in cooling operation is different from that in heating operation.

In addition, other than the vehicle air-conditioning system described in JP 2992779 B2, as a prior art vehicle air-conditioning system, JP 10-100662 A discloses a vehicle air-conditioning system in which the flow direction of the refrigerant in cooling operation is the same as that in heating operation (see [0034]-[0052]). In this vehicle air-conditioning system, unlike the vehicle air-conditioning system described in JP 2992779 B2, the refrigerant can be circulated without making all pipes to be pressure-resistant (i.e., without making the other pipes than those used in a path from the compressor to the expansion valve to be pressure-resistant).

Further, in this vehicle air-conditioning system, the air for air-conditioning is supplied to a front seat or a rear seat of the vehicle via the condenser in heating operation, and is supplied to the front seat or the rear seat of the vehicle via the evaporator in cooling operation. Also, JP 10-100662 A discloses the vehicle air-conditioning system in which a pipe having units (condenser, evaporator) to exchange heat with the air for air-conditioning supplied to the front seat and another pipe having other units (condenser, evaporator) to exchange heat with the air for air-conditioning supplied to the rear seat are connected in parallel, and each of the pipes connected in parallel is provided with the condenser and the evaporator (see FIG. 4).

In addition, in heating operation, a temperature of the air for air-conditioning supplied to the front seat is once decreased by passing by the evaporator, and is increased by passing by the condenser. The reason why the temperature of the air for air-conditioning is once decreased by passing by the evaporator is that a moisture contained in the air introduced from the outside of the vehicle should be removed (i.e., dehumidified).

As described above, comparing the prior art vehicle air-conditioning system described in JP 10-100662 A to that described in JP 2992779 B2, it is possible to reduce a manufacturing cost because not all pipes should be pressure-resistant. However, in the prior art vehicle air-conditioning system described in JP 10-100662 A, when heating operation is performed in succession, and especially when a temperature of an outside air is low, a problem arises that a dew condensation occurs at the evaporator by which the air for air-conditioning supplied to the front seat passes, and that when a dew condensation water is frozen at the evaporator, the operation can not be restarted until the dew condensation water is melted.

Also, as described above, JP 10-100662 A discloses the prior art vehicle air-conditioning system in which a pipe having an evaporator to absorb heat from the air for air-conditioning supplied to the front seat and another pipe having an evaporator to absorb heat from the air for air-conditioning supplied to the rear seat are connected in parallel. With this configuration, when an amount of absorbed heat of one evaporator is greater than that of another evaporator (that is, when an amount of evaporation of a refrigerant of one evaporator is greater than that of another evaporator), a resistance to the refrigerant flow of one evaporator becomes greater than that of another evaporator. As a result, because much refrigerant flows through another evaporator while few refrigerant flows through one evaporator, a problem arises that enough heating capacity can not be obtained at one evaporator.

Further, as shown in FIG. 4, JP 10-100662 A discloses the prior art vehicle air-conditioning system in which the pipe having the units (condenser, evaporator) to exchange heat with the air for air-conditioning supplied to the front seat and the other pipe having the other units (condenser, evaporator) to exchange heat with the air for air-conditioning supplied to the rear seat are provided with expansion valves respectively. That is, being provided with a plurality of the expansion valves requires more manufacturing cost than that of being provided with only one expansion valve.

Therefore, the present invention aims at providing the vehicle air-conditioning system to achieve the following objects (1)-(3), i.e., (1) to suppress an occurrence of the dew condensation at the evaporator in successive heating operation, (2) to obtain enough heating capacity in heating operation, and (3) to reduce the manufacturing cost.

SUMMARY OF THE INVENTION

In order to achieve the above objects, in accordance with a first aspect of the present invention, there is provided a vehicle air-conditioning system including: a first condenser in which a refrigerant circulates and exchanges heat with an outside air; a decompressing means (automated expansion valve) for decompressing the refrigerant exhausted from the first condenser; a first evaporator (radiator) in which the refrigerant passing through the decompressing means exchanges heat with an air for air-conditioning; a compressor disposed downstream of the first evaporator; a second condenser in which the refrigerant exhausted from the compressor exchanges heat with the air for air-conditioning with which the first evaporator exchanges heat; a second condenser air bypass means to supply the air for air-conditioning with which the first evaporator exchanges heat to a vehicle interior without exchanging heat at the second condenser; a bypass means control unit (ECU) to control the second condenser air bypass means such that the supplied air for air-conditioning bypasses the second condenser in a cooling operation and the supplied air for air conditioning passes through the second condenser in a heating operation, the first evaporator and the second condenser are disposed in series with a flow path of the air for air-conditioning, an air-conditioning operation is changed between cooling operation and heating operation by controlling with the bypass means control unit; and a second evaporator disposed in a flow path of the refrigerant between the decompressing means and the first evaporator, a temperature of the second evaporator is higher than that of the refrigerant decompressed by the decompressing means, and a heat exchange is performed between a fluid having a temperature higher than that of the air for air-conditioning with which the first evaporator exchanges heat and the refrigerant passing through the decompressing means.

By such a structure, in heating operation, because the refrigerant flowing into the first evaporator is heated at the second evaporator so as to reduce the absorbed heat at the first evaporator, it is possible to suppress the occurrence of the dew condensation at the first evaporator. Further, in heating operation, because the refrigerant flowing into the first evaporator is heated by a fluid having higher temperature than those of the refrigerant and the air for air-conditioning at the second evaporator, it is possible to obtain enough heating capacity. Also, because the only one decompressing means is provided, it is possible to reduce the manufacturing cost.

In accordance with a second aspect of the present invention, there is provided a vehicle air-conditioning system including a second evaporator bypass path through which the refrigerant decompressed by the decompressing means bypasses the second evaporator and flows into the first evaporator in cooling operation.

Being provided with the second evaporator bypass path, by controlling the vehicle air-conditioning system so as to bypass the second evaporator in cooling operation, it is possible to obtain a cooling efficiency comparable to that of the vehicle air-conditioning system having only the first evaporator because there is no increase in a temperature of the refrigerant by the second evaporator even if the first and second evaporators are provided.

In accordance with a third aspect of the present invention, there is provided a vehicle air-conditioning system in which the fluid which exchanges heat with the refrigerant at the second evaporator is an air exhausted from the vehicle interior.

By using the air exhausted from the vehicle interior as the fluid which exchanges heat with the refrigerant, it is possible to prevent the occurrence of the dew condensation and a freeze of the dew condensation water at the first evaporator. The reason is that the first and second evaporators absorb heat at a start time of heating operation because a temperature difference between the interior and the outside of the vehicle is small, and as the interior temperature increases, the second evaporator mainly absorbs heat and the first evaporator absorbs less heat. Also, there is no need to provide a heat source to exchange heat with the second evaporator because the air exhausted from the vehicle interior can be reused as it is.

In accordance with a fourth aspect of the present invention, there is provided a vehicle air-conditioning system in which the fluid which exchanges heat with the refrigerant at the second evaporator is a coolant used in an engine or fuel cell.

By using the coolant used in the engine or fuel cell as the fluid which exchanges heat with the refrigerant, it is possible to prevent the occurrence of the dew condensation and a freeze of the dew condensation water at the first evaporator. Because as a temperature of the coolant used in the engine or fuel cell increases, the second evaporator mainly absorbs heat and the first evaporator absorbs less heat. Also, there is no need to provide a heat source to exchange heat with the second evaporator because an exhaust heat from the coolant (heated coolant) used in the engine or fuel cell can be reused as it is.

In accordance with a fifth aspect of the present invention, there is provided a vehicle air-conditioning system in which the fluid which exchanges heat with the refrigerant at the second evaporator is an exhaust gas from the fuel cell.

By using the exhaust gas from the fuel cell as the fluid which exchanges heat with the refrigerant, it is possible to prevent the occurrence of the dew condensation and a freeze of the dew condensation water at the first evaporator. Because as a temperature of the exhaust gas from the fuel cell increases with increasing in a temperature of the fuel cell, the second evaporator mainly absorbs heat and the first evaporator absorbs less heat. Also, there is no need to provide a heat source to exchange heat with the second evaporator because heat of the exhaust gas from the fuel cell can be reused as it is.

BRIEF DESCRIPTION OF THE DRAWINGS

The object and features of the present invention will become more readily apparent from the following detailed description taken in conjunction with the accompanying drawings in which:

FIG. 1 is a block diagram of a first embodiment of the vehicle air-conditioning system according to the present invention.

FIG. 2 is a cooling operational diagram of the first embodiment of the vehicle air-conditioning system according to the present invention.

FIG. 3 is a heating operational diagram of the first embodiment of the vehicle air-conditioning system according to the present invention.

FIG. 4A and FIG. 4B are diagrams showing circulation paths of the air for air-conditioning in cooling operation and heating operation in a vehicle equipped with the first embodiment of the vehicle air-conditioning system according to the present invention.

FIG. 5A and FIG. 5B are diagrams showing circulation paths of the air for air-conditioning in cooling operation and heating operation in a vehicle equipped with a second embodiment of the vehicle air-conditioning system according to the present invention.

FIG. 6A and FIG. 6B are diagrams showing circulation paths of the air for air-conditioning in cooling operation and heating operation in a vehicle equipped with a third embodiment of the vehicle air-conditioning system according to the present invention.

FIG. 7A and FIG. 7B are diagrams showing circulation paths of the air for air-conditioning in cooling operation and heating operation in a vehicle equipped with a fourth embodiment of the vehicle air-conditioning system according to the present invention.

FIG. 8A and FIG. 8B are diagrams showing circulation paths of the air for air-conditioning in cooling operation and heating operation in a vehicle equipped with a fifth embodiment of the vehicle air-conditioning system according to the present invention.

FIG. 9A and FIG. 9B are diagrams showing circulation paths of the air for air-conditioning in cooling operation and heating operation in a vehicle equipped with a sixth embodiment of the vehicle air-conditioning system according to the present invention.

DETAILED DESCRIPTION OF THE INVENTION

Embodiments of the vehicle air-conditioning system according to the present invention will be explained below.

1. Configuration of First Embodiment

First, with reference to FIG. 1, a configuration of a first embodiment of the vehicle air-conditioning system according to the present invention will be explained. FIG. 1 is a block diagram of the first embodiment of the vehicle air-conditioning system according to the present invention. Hereinafter, the first embodiment of the vehicle air-conditioning system according to the present invention will be referred to as a vehicle air-conditioning system 1.

The vehicle air-conditioning system 1 includes a compressor 10 to discharge a compressed high-pressure gas as a refrigerant; a pipe 11 to circulate the refrigerant discharged from the compressor 10; a plurality of heat exchangers (condenser, evaporator) provided at the pipe 11 to exchange heat with an air for air-conditioning; and an automated expansion valve 12 provided with the pipe 11 to expand the refrigerant. Therefore, the high-pressure gas discharged from the compressor 10 as the refrigerant exchanges heat at the heat exchangers, and is introduced into the compressor 10 again after being expanded by the automated expansion valve 12.

Also, the vehicle air-conditioning system 1 includes four heat exchangers (i.e., a first condenser (radiator) 13, a second condenser 14, a first evaporator 15, and a second evaporator 16), and changes the heat exchangers through which the refrigerant passes between cooling operation and heating operation. For example, in cooling operation, the refrigerant passes through the second condenser 14, the first condenser 13, and the first evaporator 15, while in heating operation, the refrigerant passes through the second condenser 14, the second evaporator 16, and the first evaporator 15. In addition, the heat exchangers through which the refrigerant passes are changed by actuating changing means 17a and 17b (e.g., three-way valves) so as to change one flow path of the refrigerant to the other flow path. And, the flow path of the refrigerant is changed by actuating the changing means 17a and 17b in accordance with instructions from an ECU (Electronic Control Unit) 20 based on user's operation of an operating unit (not shown).

2. Operation of the First Embodiment

Next, with reference to FIG. 2-FIG. 4, operations of the vehicle air-conditioning system 1 in cooling operation and heating operation will be explained. FIG. 2 is a cooling operational diagram of the vehicle air-conditioning system 1. FIG. 3 is a heating operational diagram of the vehicle air-conditioning system 1. FIG. 4A and FIG. 4B are diagrams showing circulation paths of the air for air-conditioning in cooling operation and heating operation in a vehicle equipped with the vehicle air-conditioning system 1.

2.1 Cooling Operation

First, with reference to FIG. 2 and FIG. 4A, the cooling operation of the vehicle air-conditioning system 1 will be explained. As shown in FIG. 2, in cooling operation, the high-pressure gas discharged from the compressor 10 as the refrigerant radiates heat at the second condenser 14 and the first condenser 13, is expanded by the automated expansion valve 12, passes through the second evaporator bypass path 21, absorbs heat at the first evaporator 15, and flows into the compressor 10 again. The refrigerant passes through the second condenser 14, the first condenser 13, and the first evaporator 15, and the air for air-conditioning 19 is cooled by the refrigerant absorbing heat from the air for air-conditioning 19 at the first evaporator 15.

In addition, the automated expansion valve 12 has a means (not shown) for sensing a temperature of the refrigerant which flowed out of the first evaporator 15 to cool the air for air-conditioning 19 and regulates a flow rate of the refrigerant by changing a degree of opening of the automated expansion valve 12 depending on the temperature of the refrigerant which flowed out of the first evaporator 15. Concretely, as an outflowing temperature relative to an evaporating temperature at a pressure of the refrigerant which flowed out of the first evaporator 15 increases, the flow rate of the refrigerant which flowed out of the automated expansion valve 12 is increased by increasing the degree of opening. Conversely, as the temperature of the refrigerant which flowed out of the first evaporator 15 decreases, the flow rate of the refrigerant which flowed out of the automated expansion valve 12 is decreased by decreasing the degree of opening.

That is, because a heat-absorbing capacity of the first evaporator 15 is insufficient owing to a low flow rate of the refrigerant, when the heat-absorbing capacity of the first evaporator 15 is insufficient owing to increase in the outflowing temperature relative to the evaporating temperature at the pressure of the refrigerant which flowed out of the first evaporator 15, the heat-absorbing capacity of the first evaporator 15 is increased by increasing the degree of opening of the automated expansion valve 12 so as to increase the flow rate of the refrigerant. Conversely, because the heat-absorbing capacity of the first evaporator 15 is increased as the flow rate of the refrigerant is increased, when the heat-absorbing capacity of the first evaporator 15 is too large owing to the outflowing temperature approaching the evaporating temperature at the pressure of the refrigerant which flowed out of the first evaporator 15, the heat-absorbing capacity of the first evaporator 15 is decreased by decreasing the degree of opening of the automated expansion valve 12 so as to decrease the flow rate of the refrigerant.

As described above, in cooling operation, because there is no increase in a temperature of the refrigerant by the second evaporator 16 owing to the refrigerant not passing through the second evaporator 16 (that is, the refrigerant bypassing the second evaporator 16), there is no decrease in the cooling efficiency of the air for air-conditioning 19. That is, it is possible to obtain a cooling efficiency comparable to that of the vehicle air-conditioning system having only the first evaporator 15. Also, prior to absorbing heat from the air for air-conditioning 19 at the first evaporator 15, the refrigerant radiates heat to the outside air at the first condenser 13 so as to decrease temperature of the refrigerant.

On the other hand, after being cooled at the first evaporator 15, the air for air-conditioning 19 bypasses the second condenser 14 through a second condenser air bypass means 18 so as to be supplied to the vehicle interior. In addition, for example, as shown in FIG. 4A, the second condenser air bypass means 18 is an air mix damper 40 to prevent the air for air-conditioning passing by the first evaporator 15 from passing through the second condenser 14 so as not to be heated.

2.2 Heating Operation

Next, with reference to FIG. 3 and FIG. 4B, the heating operation of the vehicle air-conditioning system 1 will be explained. As shown in FIG. 3, in heating operation, the high-pressure gas discharged from the compressor 10 as the refrigerant radiates heat at the second condenser 14, is expanded by the automated expansion valve 12, bypasses the second evaporator bypass path 21, absorbs heat at the second evaporator 16 and the first evaporator 15, and flows into the compressor 10 again. In addition, the reason why the refrigerant absorbs heat at the second evaporator 16 prior to absorbing heat at the first evaporator 15 is that the occurrence of the dew condensation at the first evaporator 15 is suppressed to prevent the freeze of the dew condensation water.

That is, as shown in FIG. 4B, because the air for air-conditioning 19 is introduced from the outside of the vehicle in heating operation, even if the temperature of the outside air is low and the temperature of the air for air-conditioning 19 passing by the first evaporator 15 is low, the refrigerant flowing into the first evaporator 15 can be heated by absorbing heat from heat sources (e.g., an exhaust heat gas in the vehicle interior, an engine coolant, or a hot-water heater, etc.) at the second evaporator 16. Therefore, it is possible to suppress the occurrence of the dew condensation at the first evaporator 15 to prevent the freeze of the dew condensation water by decreasing heat absorbed at the first evaporator 15.

On the other hand, the air for air-conditioning 19 is once cooled by the refrigerant absorbing heat from the air for air-conditioning 19 at the first evaporator 15, is heated by the refrigerant radiating heat at the second condenser 14, and is exhausted into the vehicle interior. In addition, the reason why the air for air-conditioning 19 is heated at the second condenser 14 after being once cooled at the first evaporator 15 is that the moisture contained in the air introduced from the outside of the vehicle should be removed (i.e., dehumidified).

2.3 Summary

As described above, in the vehicle air-conditioning system 1, it is possible to obtain a cooling efficiency comparable to that of the vehicle air-conditioning system having only the first evaporator 15, because there is no increase in the temperature of the refrigerant at the second evaporator 16 in cooling operation in spite of the presence of the first and second evaporators. On the other hand, in heating operation, it is possible to suppress the occurrence of the dew condensation at an evaporator which exchanges heat with the air for air-conditioning 19 (i.e., first evaporator 15) to prevent the freeze of the dew condensation water.

3. Other Embodiments of the Vehicle Air-Conditioning System

Embodiments of the vehicle air-conditioning system other than the first embodiment will be explained below.

3.1 Second Embodiment of Vehicle Air-Conditioning System

First, with reference to FIG. 5A and FIG. 5B, a second embodiment of the vehicle air-conditioning system according to the present invention will be explained. FIG. 5A and FIG. 5B are diagrams showing a configuration of the second embodiment of the vehicle air-conditioning system and circulation paths of the air for air-conditioning in cooling operation and heating operation. Hereinafter, the second embodiment of the vehicle air-conditioning system according to the present invention will be referred to as a vehicle air-conditioning system 5.

With reference to FIG. 5A and FIG. 5B, the vehicle air-conditioning system 5 has a configuration in which the second condenser 14 of the vehicle air-conditioning system of the first embodiment according to the present invention is replaced with a second condenser including a pump 50 to discharge a hot water, and a pipe 51 in which the hot water circulates. And, the pipe 51 has a first heat exchanger 51a to exchange heat with the refrigerant, and a second heat exchanger 51b to exchange heat with the air for air-conditioning 19.

Further, like the first embodiment of the vehicle air-conditioning system according to the present invention, the vehicle air-conditioning system 5 changes the heat exchangers through which the refrigerant passes between cooling operation and heating operation. For example, in cooling operation, the refrigerant passes through the first heat exchanger 51a of the second condenser, the first condenser 13, and the first evaporator 15, while in heating operation, the refrigerant passes through the first heat exchanger 51a of the second condenser, the second evaporator 16, and the first evaporator 15. In addition, like the first embodiment of the vehicle air-conditioning system according to the present invention, the heat exchangers through which the refrigerant passes are changed by actuating changing means 17a and 17b (e.g., three-way valves) so as to change one flow path of the refrigerant to the other flow path. And, the flow path of the refrigerant is changed by actuating the changing means 17a and 17b in accordance with instructions from an ECU (Electronic Control Unit) 20 based on user's operation of an operating unit (not shown).

With reference to FIG. 5A, the cooling operation of the vehicle air-conditioning system 5 will be explained. In cooling operation, the high-pressure gas discharged from the compressor 10 as the refrigerant radiates heat at the first heat exchanger 51a of the second condenser and the first condenser 13, is expanded by the automated expansion valve 12, absorbs heat at the first evaporator 15, and flows into the compressor 10 again. The refrigerant passes through the first heat exchanger 51a of the second condenser, the first condenser 13, and the first evaporator 15, and the air for air-conditioning 19 is cooled by the refrigerant absorbing heat from the air for air-conditioning 19 at the first evaporator 15. In addition, like the first embodiment of the vehicle air-conditioning system according to the present invention, because there is no increase in a temperature of the refrigerant by the second evaporator 16, there is no decrease in the cooling efficiency. That is, it is possible to obtain a cooling efficiency comparable to that of the vehicle air-conditioning system having only the first evaporator 15.

On the other hand, after being cooled at the first evaporator 15, the air for air-conditioning 19 bypasses the second heat exchanger 51b of the second condenser through a second condenser air bypass means so as to be supplied to the vehicle interior. In addition, for example, as shown in FIG. 5A, the second condenser air bypass means is an air mix damper 52 to prevent the air for air-conditioning 19 passing by the first evaporator 15 from passing by the second heat exchanger 51b of the second condenser so as not to be heated.

With reference to FIG. 5B, the heating operation of the vehicle air-conditioning system 5 will be explained. In heating operation, the high-pressure gas discharged from the compressor 10 as the refrigerant radiates heat at the first heat exchanger 51a of the second condenser, is expanded by the automated expansion valve 12, absorbs heat at the second evaporator 16 and the first evaporator 15, and flows into the compressor 10 again. In addition, the reason why the refrigerant absorbs heat at the second evaporator 16 prior to absorbing heat at the first evaporator 15 is that the occurrence of the dew condensation at the first evaporator 15 is suppressed to prevent the freeze of the dew condensation water.

That is, as shown in FIG. 5B, because the air for air-conditioning 19 is introduced from the outside of the vehicle in heating operation, even if the temperature of the outside air is low and the temperature of the air for air-conditioning 19 passing by the first evaporator 15 is low, the refrigerant flowing into the first evaporator 15 can be heated by absorbing heat from heat sources (e.g., an exhaust heat gas in the vehicle interior, an engine coolant, and a hot-water heater, etc.) at the second evaporator 16. Therefore, it is possible to suppress the occurrence of the dew condensation at the first evaporator 15 to prevent the freeze of the dew condensation water by decreasing heat absorbed at the first evaporator 15.

On the other hand, the air for air-conditioning 19 is once cooled by the refrigerant absorbing heat from the air for air-conditioning 19 at the first evaporator 15, is heated by the refrigerant radiating heat at the second heat exchanger 51b of the second condenser, and is exhausted into the vehicle interior. In addition, the reason why the air for air-conditioning 19 is heated at the second heat exchanger 51b of the second condenser after being once cooled at the first evaporator 15 is that the moisture contained in the air introduced from the outside of the vehicle should be removed (i.e., dehumidified).

As described above, like the first embodiment of the vehicle air-conditioning system according to the present invention, in the vehicle air-conditioning system 5, it is possible to obtain a cooling efficiency comparable to that of the vehicle air-conditioning system having only the first evaporator 15, because there is no increase in the temperature of the refrigerant at the second evaporator 16 in cooling operation in spite of the presence of the first and second evaporators. On the other hand, in heating operation, it is possible to suppress the occurrence of the dew condensation at an evaporator which exchanges heat with the air for air-conditioning 19 (i.e., first evaporator 15) to prevent the freeze of the dew condensation water. Especially, when the temperature of the hot water circulating in the pipe 51 is high, because the second evaporator 16 mainly absorbs heat and the first evaporator 15 absorbs less heat, it is easy to prevent the occurrence of the dew condensation and a freeze of the dew condensation water at the first evaporator 15.

3.2 Third Embodiment of Vehicle Air-Conditioning System

Next, with reference to FIG. 6A and FIG. 6B, a third embodiment of the vehicle air-conditioning system according to the present invention will be explained. FIG. 6A and FIG. 6B are diagrams showing a configuration of the third embodiment of the vehicle air-conditioning system and circulation paths of the air for air-conditioning in cooling operation and heating operation. Hereinafter, the third embodiment of the vehicle air-conditioning system according to the present invention will be referred to as a vehicle air-conditioning system 6.

With reference to FIG. 6A and FIG. 6B, the vehicle air-conditioning system 6 uses an engine coolant as a heat source in heating operation. In addition, in heating operation, a heat of the engine coolant from an engine 60 is absorbed at a second evaporator 61. And, the heat of the engine coolant absorbed at the second evaporator 61 is conducted to the first evaporator 15 via the refrigerant circulating in the pipe 11, and is further conducted to the air for air-conditioning 19 to be supplied to the vehicle interior from the first evaporator 15.

Further, like the first embodiment of the vehicle air-conditioning system according to the present invention, the vehicle air-conditioning system 6 changes the heat exchangers through which the refrigerant passes between cooling operation and heating operation. For example, in cooling operation, the refrigerant passes through the second condenser 14, the first condenser 13, and the first evaporator 15, while in heating operation, the refrigerant passes through the second condenser 14, the second evaporator 61, and the first evaporator 15. In addition, like the first embodiment of the vehicle air-conditioning system according to the present invention, the heat exchangers through which the refrigerant passes are changed by actuating changing means 17a and 17b (e.g., three-way valves) so as to change one flow path of the refrigerant to the other flow path. And, the flow path of the refrigerant is changed by actuating the changing means 17a and 17b in accordance with instructions from an ECU (Electronic Control Unit) 20 based on user's operation of an operating unit (not shown).

With reference to FIG. 6A, the cooling operation of the vehicle air-conditioning system 6 will be explained. In cooling operation, the high-pressure gas discharged from the compressor 10 as the refrigerant radiates heat at the second condenser 14 and the first condenser 13, is expanded by the automated expansion valve 12, absorbs heat at the first evaporator 15, and flows into the compressor 10 again. The refrigerant passes through the second condenser 14, the first condenser 13, and the first evaporator 15, and the air for air-conditioning 19 is cooled by the refrigerant absorbing heat from the air for air-conditioning 19 at the first evaporator 15. In addition, like the first embodiment of the vehicle air-conditioning system according to the present invention, because there is no increase in a temperature of the refrigerant by the second evaporator 61, there is no decrease in the cooling efficiency. That is, it is possible to obtain a cooling efficiency comparable to that of the vehicle air-conditioning system having only the first evaporator 15.

On the other hand, after being cooled at the first evaporator 15, the air for air-conditioning 19 bypasses the second condenser 14 through a second condenser air bypass means so as to be supplied to the vehicle interior. In addition, for example, as shown in FIG. 6A, the second condenser air bypass means is an air mix damper 40 to prevent the air for air-conditioning 19 passing by the first evaporator 15 from passing by the second condenser 14 so as not to be heated.

With reference to FIG. 6B, the heating operation of the vehicle air-conditioning system 6 will be explained. In heating operation, the high-pressure gas discharged from the compressor 10 as the refrigerant radiates heat at the second condenser 14, is expanded by the automated expansion valve 12, absorbs heat at the second evaporator 61 and the first evaporator 15, and flows into the compressor 10 again. In addition, the reason why the refrigerant absorbs heat at the second evaporator 61 prior to absorbing heat at the first evaporator 15 is that the occurrence of the dew condensation at the first evaporator 15 is suppressed to prevent the freeze of the dew condensation water.

That is, as shown in FIG. 6B, because the air for air-conditioning 19 is introduced from the outside of the vehicle, even if the temperature of the outside air is low and the temperature of the air for air-conditioning 19 passing by the first evaporator 15 is low, the refrigerant flowing into the first evaporator 15 can be heated by absorbing heat from an engine coolant at the second evaporator 61 as described above. Therefore, it is possible to suppress the occurrence of the dew condensation at the first evaporator 15 to prevent the freeze of the dew condensation water by decreasing heat absorbed at the first evaporator 15. In addition, the engine coolant used as a heat source in the vehicle air-conditioning system 6 is circulated by being introduced into the engine 60 again after being supplied to the second evaporator 61 from the engine 60 via a pipe 62 which is a flow path.

On the other hand, the air for air-conditioning 19 is once cooled by the refrigerant absorbing heat from the air for air-conditioning 19 at the first evaporator 15, is heated by the refrigerant radiating heat at the second condenser 14, and is exhausted into the vehicle interior. In addition, the reason why the air for air-conditioning 19 is heated at the second condenser 14 after being once cooled at the first evaporator 15 is that the moisture contained in the air introduced from the outside of the vehicle should be removed (i.e., dehumidified).

As described above, like the first embodiment of the vehicle air-conditioning system according to the present invention, in the vehicle air-conditioning system 6, it is possible to obtain a cooling efficiency comparable to that of the vehicle air-conditioning system having only the first evaporator 15, because there is no increase in the temperature of the refrigerant at the second evaporator 61 in cooling operation in spite of the presence of the first and second evaporators. On the other hand, in heating operation, it is possible to suppress the occurrence of the dew condensation at an evaporator which exchanges heat with the air for air-conditioning 19 (i.e., first evaporator 15) to prevent the freeze of the dew condensation water.

Especially, when the temperature of the engine coolant is high, because the second evaporator 61 mainly absorbs heat and the first evaporator 15 absorbs less heat, it is easy to prevent the occurrence of the dew condensation and a freeze of the dew condensation water at the first evaporator 15. Also, there is no need to provide a heat source to exchange heat with the second evaporator 61 because the heat exhausted from the high-temperature engine can be reused as it is.

In addition, although the engine coolant is used as the heat source in the vehicle air-conditioning system 6, various changes and modifications may be made. Other than the engine coolant, it is possible to obtain a cooling efficiency comparable to that of the vehicle air-conditioning system having only the first evaporator 15 by using a fuel cell coolant, etc. as the heat source. On the other hand, in heating operation, it is also possible to suppress the occurrence of the dew condensation at the evaporator which exchanges heat with the air for air-conditioning (that is, first evaporator 15) to prevent the freeze of the dew condensation water. Further, in heating operation, there is no need to provide a heat source to exchange heat with the second evaporator 61 because the heat exhausted from the high-temperature fuel cell can be reused as it is.

3.3 Fourth Embodiment of Vehicle Air-Conditioning System

Next, with reference to FIG. 7A and FIG. 7B, a fourth embodiment of the vehicle air-conditioning system according to the present invention will be explained. FIG. 7A and FIG. 7B are diagrams showing a configuration of the fourth embodiment of the vehicle air-conditioning system and circulation paths of the air for air-conditioning in cooling operation and heating operation. Hereinafter, the fourth embodiment of the vehicle air-conditioning system according to the present invention will be referred to as a vehicle air-conditioning system 7.

With reference to FIG. 7A and FIG. 7B, the vehicle air-conditioning system 7 of the fourth embodiment is provided with an ejector 70 between the automated expansion valve 12 and the changing mean 17b in the first embodiment according to the present invention. And, the refrigerant is circulated by an ejection power of the ejector 70.

Further, like the first embodiment of the vehicle air-conditioning system according to the present invention, the vehicle air-conditioning system 7 changes the heat exchangers through which the refrigerant passes between cooling operation and heating operation. For example, in cooling operation, the refrigerant passes through the second condenser 14, the first condenser 13, and the first evaporator 15, while in heating operation, the refrigerant passes through the second condenser 14, the second evaporator 16, and the first evaporator 15. In addition, like the first embodiment of the vehicle air-conditioning system according to the present invention, the heat exchangers through which the refrigerant passes are changed by actuating changing means 17a, 17b, and 17c (e.g., three-way valves) so as to change one flow path of the refrigerant to the other flow path. And, the flow path of the refrigerant is changed by actuating the changing means 17a, 17b, and 17c in accordance with instructions from an ECU (Electronic Control Unit) 20 based on user's operation of an operating unit (not shown).

With reference to FIG. 7A, the cooling operation of the vehicle air-conditioning system 7 will be explained. In cooling operation, the high-pressure gas discharged from the compressor 10 as the refrigerant radiates heat at the second condenser 14 and the first condenser 13, is expanded by the automated expansion valve 12, is ejected by the ejector 70, absorbs heat at the first evaporator 15, and flows into the compressor 10 again. The refrigerant passes through the second condenser 14, the first condenser 13, and the first evaporator 15, and the air for air-conditioning 19 is cooled by the refrigerant absorbing heat from the air for air-conditioning 19 at the first evaporator 15. In addition, like the first embodiment of the vehicle air-conditioning system according to the present invention, because there is no increase in a temperature of the refrigerant by the second evaporator 16, there is no decrease in the cooling efficiency. That is, it is possible to obtain a cooling efficiency comparable to that of the vehicle air-conditioning system having only the first evaporator 15.

On the other hand, after being cooled at the first evaporator 15, the air for air-conditioning 19 bypasses the second condenser 14 through a second condenser air bypass means so as to be supplied to the vehicle interior. In addition, for example, as shown in FIG. 7A, the second condenser air bypass means is an air mix damper 40 to prevent the air for air-conditioning 19 passing by the first evaporator 15 from passing by the second condenser 14 so as not to be heated.

With reference to FIG. 7B, the heating operation of the vehicle air-conditioning system 7 will be explained. In heating operation, the high-pressure gas discharged from the compressor 10 as the refrigerant radiates heat at the second condenser 14, is expanded by the automated expansion valve 12, is ejected by the ejector 70, absorbs heat at the second evaporator 16 and the first evaporator 15, and flows into the compressor 10 again. In addition, the reason why the refrigerant absorbs heat at the second evaporator 16 prior to absorbing heat at the first evaporator 15 is that the occurrence of the dew condensation at the first evaporator 15 is suppressed to prevent the freeze of the dew condensation water.

That is, as shown in FIG. 7B, because the air for air-conditioning 19 is introduced from the outside of the vehicle, even if the temperature of the outside air is low and the temperature of the air for air-conditioning 19 passing by the first evaporator 15 is low, the refrigerant flowing into the first evaporator 15 can be heated by absorbing heat from an exhaust heat at the second evaporator 16 as described above. Therefore, it is possible to suppress the occurrence of the dew condensation at the first evaporator 15 to prevent the freeze of the dew condensation water by decreasing heat absorbed at the first evaporator 15.

On the other hand, the air for air-conditioning 19 is once cooled by the refrigerant absorbing heat from the air for air-conditioning 19 at the first evaporator 15, is heated by the refrigerant radiating heat at the second condenser 14, and is exhausted into the vehicle interior. In addition, the reason why the air for air-conditioning 19 is heated at the second condenser 14 after being once cooled at the first evaporator 15 is that the moisture contained in the air introduced from the outside of the vehicle should be removed (i.e., dehumidified).

As described above, like the first embodiment of the vehicle air-conditioning system according to the present invention, in the vehicle air-conditioning system 7, it is possible to obtain a cooling efficiency comparable to that of the vehicle air-conditioning system having only the first evaporator 15, because there is no increase in the temperature of the refrigerant at the second evaporator 16 in cooling operation in spite of the presence of the first and second evaporators. On the other hand, in heating operation, it is possible to suppress the occurrence of the dew condensation at an evaporator which exchanges heat with the air for air-conditioning 19 (i.e., first evaporator 15) to prevent the freeze of the dew condensation water.

3.4 Fifth Embodiment of Vehicle Air-Conditioning System

Next, with reference to FIG. 8A and FIG. 8B, a fifth embodiment of the vehicle air-conditioning system according to the present invention will be explained. FIG. 8A and FIG. 8B are diagrams showing a configuration of the fifth embodiment of the vehicle air-conditioning system and circulation paths of the air for air-conditioning in cooling operation and heating operation. Hereinafter, the fifth embodiment of the vehicle air-conditioning system according to the present invention will be referred to as a vehicle air-conditioning system 8.

With reference to FIG. 8A and FIG. 8B, the vehicle air-conditioning system 8 uses an engine coolant as a heat source in heating operation, and is provided with an ejector 70 between the automated expansion valve 12 and the changing mean 17b in the first embodiment according to the present invention. In addition, with reference to FIG. 8B, in heating operation, the heat of the engine coolant exhausted from the engine 60 via the pipe 62 is absorbed at the second evaporator 61. And, the heat of the engine coolant absorbed at the second evaporator 61 is conducted to the first evaporator 15 via the refrigerant circulating in the pipe 11, and is further conducted to the air for air-conditioning 19 to be supplied to the vehicle interior from the first evaporator 15. Also, the refrigerant is circulated by an ejection power of the ejector 70.

Further, like the first embodiment of the vehicle air-conditioning system according to the present invention, the vehicle air-conditioning system 8 changes the heat exchangers through which the refrigerant passes between cooling operation and heating operation. For example, in cooling operation, the refrigerant passes through the second condenser 14, the first condenser 13, and the first evaporator 15, while in heating operation, the refrigerant passes through the second condenser 14, the second evaporator 61, and the first evaporator 15. In addition, like the first embodiment of the vehicle air-conditioning system according to the present invention, the heat exchangers through which the refrigerant passes are changed by actuating changing means 17a, 17b, and 17c (e.g., three-way valves) so as to change one flow path of the refrigerant to the other flow path. And, the flow path of the refrigerant is changed by actuating the changing means 17a, 17b, and 17c in accordance with instructions from an ECU (Electronic Control Unit) 20 based on user's operation of an operating unit (not shown).

With reference to FIG. 8A, the cooling operation of the vehicle air-conditioning system 8 will be explained. In cooling operation, the high-pressure gas discharged from the compressor 10 as the refrigerant radiates heat at the second condenser 14 and the first condenser 13, is expanded by the automated expansion valve 12, is ejected by the ejector 70, absorbs heat at the first evaporator 15, and flows into the compressor 10 again. The refrigerant passes through the second condenser 14, the first condenser 13, and the first evaporator 15, and the air for air-conditioning 19 is cooled by the refrigerant absorbing heat from the air for air-conditioning 19 at the first evaporator 15. In addition, like the first embodiment of the vehicle air-conditioning system according to the present invention, because there is no increase in a temperature of the refrigerant by the second evaporator 61, there is no decrease in the cooling efficiency. That is, it is possible to obtain a cooling efficiency comparable to that of the vehicle air-conditioning system having only the first evaporator 15.

On the other hand, after being cooled at the first evaporator 15, the air for air-conditioning 19 bypasses the second condenser 14 through a second condenser air bypass means so as to be supplied to the vehicle interior. In addition, for example, as shown in FIG. 8A, the second condenser air bypass means is an air mix damper 40 to prevent the air for air-conditioning 19 passing by the first evaporator 15 from passing by the second condenser 14 so as not to be heated.

With reference to FIG. 8B, the heating operation of the vehicle air-conditioning system 8 will be explained. In heating operation, the high-pressure gas discharged from the compressor 10 as the refrigerant radiates heat at the second condenser 14, is expanded by the automated expansion valve 12, is ejected by the ejector 70, absorbs heat at the second evaporator 61 and the first evaporator 15, and flows into the compressor 10 again. In addition, the reason why the refrigerant absorbs heat at the second evaporator 61 prior to absorbing heat at the first evaporator 15 is that the occurrence of the dew condensation at the first evaporator 15 is suppressed to prevent the freeze of the dew condensation water.

That is, as shown in FIG. 8B, because the air for air-conditioning 19 is introduced from the outside of the vehicle, even if the temperature of the outside air is low and the temperature of the air for air-conditioning 19 passing by the first evaporator 15 is low, the refrigerant flowing into the first evaporator 15 can be heated by absorbing heat from an engine coolant at the second evaporator 61 as described above. Therefore, it is possible to suppress the occurrence of the dew condensation at the first evaporator 15 to prevent the freeze of the dew condensation water by decreasing heat absorbed at the first evaporator 15. In addition, the engine coolant used as a heat source in the vehicle air-conditioning system 8 is circulated by being introduced into the engine 60 again after being supplied to the second evaporator 61 from the engine 60 via a pipe 62.

On the other hand, the air for air-conditioning 19 is once cooled by the refrigerant absorbing heat from the air for air-conditioning 19 at the first evaporator 15, is heated by the refrigerant radiating heat at the second condenser 14, and is exhausted into the vehicle interior. In addition, the reason why the air for air-conditioning 19 is heated at the second condenser 14 after being once cooled at the first evaporator 15 is that the moisture contained in the air introduced from the outside of the vehicle should be removed (i.e., dehumidified).

As described above, like the first embodiment of the vehicle air-conditioning system according to the present invention, in the vehicle air-conditioning system 8, it is possible to obtain a cooling efficiency comparable to that of the vehicle air-conditioning system having only the first evaporator 15, because there is no increase in the temperature of the refrigerant at the second evaporator 61 in cooling operation in spite of the presence of the first and second evaporators. On the other hand, in heating operation, it is possible to suppress the occurrence of the dew condensation at an evaporator which exchanges heat with the air for air-conditioning 19 (i.e., first evaporator 15) to prevent the freeze of the dew condensation water.

Especially, when the temperature of the engine coolant is high, because the second evaporator 61 mainly absorbs heat and the first evaporator 15 absorbs less heat, it is easy to prevent the occurrence of the dew condensation and a freeze of the dew condensation water at the first evaporator 15. Also, there is no need to provide a heat source to exchange heat with the second evaporator 61 because the heat exhausted from the high-temperature engine can be reused as it is.

In addition, although the engine coolant is used as the heat source in the vehicle air-conditioning system 8, various changes and modifications may be made. Other than the engine coolant, it is possible to obtain a cooling efficiency comparable to that of the vehicle air-conditioning system having only the first evaporator 15 by using a fuel cell coolant, etc. as the heat source. On the other hand, in heating operation, it is also possible to suppress the occurrence of the dew condensation at the evaporator which exchanges heat with the air for air-conditioning 19 (that is, first evaporator 15) to prevent the freeze of the dew condensation water. Further, in heating operation, there is no need to provide a heat source to exchange heat with the second evaporator 61 because the heat exhausted from the high-temperature fuel cell can be reused as it is.

3.5 Sixth Embodiment of Vehicle Air-Conditioning System

Next, with reference to FIG. 9A and FIG. 9B, a Sixth embodiment of the vehicle air-conditioning system according to the present invention will be explained. FIG. 9A and FIG. 9B are diagrams showing a configuration of the sixth embodiment of the vehicle air-conditioning system and circulation paths of the air for air-conditioning in cooling operation and heating operation. Hereinafter, the sixth embodiment of the vehicle air-conditioning system according to the present invention will be referred to as a vehicle air-conditioning system 9.

With reference to FIG. 9A and FIG. 9B, the vehicle air-conditioning system 9 uses an exhaust gas from a fuel cell 90 as a heat source in heating operation. In addition, in heating operation, a heat of the exhaust gas from the fuel cell 90 (that is, the heat of the exhaust gas exhausted from the fuel cell 90 via a diluter 91) is absorbed at a second evaporator 16. And, the heat of the exhaust gas absorbed at the second evaporator 16 is conducted to the first evaporator 15 via the refrigerant circulating in the pipe 11, and is further conducted to the air for air-conditioning 19 to be supplied to the vehicle interior from the first evaporator 15.

Further, like the first embodiment of the vehicle air-conditioning system according to the present invention, the vehicle air-conditioning system 9 changes the heat exchangers through which the refrigerant passes between cooling operation and heating operation. For example, in cooling operation, the refrigerant passes through the second condenser 14, the first condenser 13, and the first evaporator 15, while in heating operation, the refrigerant passes through the second condenser 14, the second evaporator 16, and the first evaporator 15. In addition, like the first embodiment of the vehicle air-conditioning system according to the present invention, the heat exchangers through which the refrigerant passes are changed by actuating changing means 17a and 17b (e.g., three-way valves) so as to change one flow path of the refrigerant to the other flow path. And, the flow path of the refrigerant is changed by actuating the changing means 17a and 17b in accordance with instructions from an ECU (Electronic Control Unit) 20 based on user's operation of an operating unit (not shown).

With reference to FIG. 9A, the cooling operation of the vehicle air-conditioning system 9 will be explained. In cooling operation, the high-pressure gas discharged from the compressor 10 as the refrigerant radiates heat at the second condenser 14 and the first condenser 13, is expanded by the automated expansion valve 12, absorbs heat at the first evaporator 15, and flows into the compressor 10 again. The refrigerant passes through the second condenser 14, the first condenser 13, and the first evaporator 15, and the air for air-conditioning 19 is cooled by the refrigerant absorbing heat from the air for air-conditioning 19 at the first evaporator 15. In addition, like the first embodiment of the vehicle air-conditioning system according to the present invention, because there is no increase in a temperature of the refrigerant by the second evaporator 16, there is no decrease in the cooling efficiency. That is, it is possible to obtain a cooling efficiency comparable to that of the vehicle air-conditioning system having only the first evaporator 15.

On the other hand, after being cooled at the first evaporator 15, the air for air-conditioning 19 bypasses the second condenser 14 through a second condenser air bypass means so as to be supplied to the vehicle interior. In addition, for example, as shown in FIG. 9A, the second condenser air bypass means is an air mix damper 40 to prevent the air for air-conditioning 19 passing by the first evaporator 15 from passing by the second condenser 14 so as not to be heated.

With reference to FIG. 9B, the heating operation of the vehicle air-conditioning system 9 will be explained. In heating operation, the high-pressure gas discharged from the compressor 10 as the refrigerant radiates heat at the second condenser 14, is expanded by the automated expansion valve 12, absorbs heat at the second evaporator 16 and the first evaporator 15, and flows into the compressor 10 again. In addition, the reason why the refrigerant absorbs heat at the second evaporator 16 prior to absorbing heat at the first evaporator 15 is that the occurrence of the dew condensation at the first evaporator 15 is suppressed to prevent the freeze of the dew condensation water.

That is, as shown in FIG. 9B, because the air for air-conditioning 19 is introduced from the outside of the vehicle, even if the temperature of the outside air is low and the temperature of the air for air-conditioning 19 passing by the first evaporator 15 is low, the refrigerant flowing into the first evaporator 15 can be heated by absorbing heat from the exhaust gas from the fuel cell at the second evaporator 16 as described above. Therefore, it is possible to suppress the occurrence of the dew condensation at the first evaporator 15 to prevent the freeze of the dew condensation water by decreasing heat absorbed at the first evaporator 15.

In addition, as shown in FIG. 9B, the exhaust gas from the fuel cell 90 used as the heat source of the vehicle air-conditioning system 9 is generated by mixing a hydrogen gas exhausted from the fuel cell 90 via a purge valve 92 and an air exhausted from the fuel cell 90 via a back-pressure regulating valve 93 at the diluter 91. And, the exhaust gas generated at the diluter 91 exchanges heat at the second evaporator 16, and is discharged into the outside of the vehicle. In addition, an ejector 94 brings back an unreacted hydrogen exhausted from the fuel cell to the fuel cell to recirculate the hydrogen, and a compressor 95 discharges a high-pressure air into the fuel cell 90.

On the other hand, the air for air-conditioning 19 is once cooled by the refrigerant absorbing heat from the air for air-conditioning 19 at the first evaporator 15, is heated by the refrigerant radiating heat at the second condenser 14, and is exhausted into the vehicle interior. In addition, the reason why the air for air-conditioning 19 is heated at the second condenser 14 after being once cooled at the first evaporator 15 is that the moisture contained in the air introduced from the outside of the vehicle should be removed (i.e., dehumidified).

As described above, like the first embodiment of the vehicle air-conditioning system according to the present invention, in the vehicle air-conditioning system 8, it is possible to obtain a cooling efficiency comparable to that of the vehicle air-conditioning system having only the first evaporator 15, because there is no increase in the temperature of the refrigerant at the second evaporator 16 in cooling operation in spite of the presence of the first and second evaporators.

On the other hand, in heating operation, it is possible to suppress the occurrence of the dew condensation at an evaporator which exchanges heat with the air for air-conditioning 19 (i.e., first evaporator 15) to prevent the freeze of the dew condensation water. Especially, when the temperature of the exhaust gas from the fuel cell 90 is high, because the second evaporator 16 mainly absorbs heat and the first evaporator 15 absorbs less heat, it is easy to suppress the occurrence of the dew condensation to prevent a freeze of the dew condensation water at the first evaporator 15. Also, there is no need to provide a heat source to exchange heat with the second evaporator 16 because the heat of the exhaust gas from the high-temperature engine can be reused as it is.

What is claimed is:

1. A vehicle air-conditioning system comprising:
    a first condenser wherein a refrigerant circulates and exchanges heat with an outside air;
    a single decompressing means for decompressing the refrigerant in cooling and heating operations;
    a first evaporator wherein the refrigerant passing through the single decompressing means exchanges heat with an air for air-conditioning;
    a compressor disposed downstream of the first evaporator;
    a second condenser wherein the refrigerant exhausted from the compressor exchanges heat with the air for air-conditioning with which the first evaporator exchanges heat;
    a second condenser air bypass means to supply the air for air-conditioning with which the first evaporator exchanges heat to a vehicle interior without exchanging heat at the second condenser;
    a bypass means control unit to control the second condenser air bypass means such that the supplied air for air-conditioning bypasses the second condenser in a cooling operation and the supplied air for air conditioning passes through the second condenser in a heating operation, the first evaporator and the second condenser are disposed in series with a flow path of the air for air-conditioning, an air-conditioning operation is changed between cooling operation and heating operation by controlling with the bypass means control unit;
    a second evaporator disposed in a flow path of the refrigerant between the single decompressing means and the first evaporator where a heat exchange is performed in the second evaporator between a fluid other than the air supplied to the vehicle interior for air conditioning and the refrigerant so as to heat the refrigerant, the fluid having a temperature higher than the refrigerant passing through the second evaporator, the refrigerant heated in the second evaporator supplied to the first evaporator in a heating operation, the heated refrigerant preventing dew condensation in the first evaporator when air from outside the vehicle is introduced to the first evaporator; and
    a second evaporator bypass path through which the refrigerant decompressed by the single decompressing means bypasses the second evaporator and flows into the first evaporator in the cooling operation,
    wherein the refrigerant is diverted while flowing through an actuating change means to the second evaporator bypass path, the actuating change means located downstream of the single decompressing means and located between the first and second condensers, and the first condenser is disposed between the second condenser and the single decompressing means, and wherein in the heating operation the refrigerant flows from the single decompressing means to the second evaporator through the actuating change means.

2. The system according to claim 1, wherein the fluid which exchanges heat with the refrigerant at the second evaporator is an air exhausted from the vehicle interior.

3. The system according to claim 1, wherein the fluid which exchanges heat with the refrigerant at the second evaporator is an air exhausted from the vehicle interior.

4. The system according to claim 1, wherein the fluid which exchanges heat with the refrigerant at the second evaporator is a coolant used in an engine or fuel cell.

5. The system according to claim 1, wherein the fluid which exchanges heat with the refrigerant at the second evaporator is a coolant used in an engine or fuel cell.

6. The system according to claim 1, wherein the fluid which exchanges heat with the refrigerant at the second evaporator is an exhaust gas from the fuel cell.

7. The system according to claim 1, wherein the fluid which exchanges heat with the refrigerant at the second evaporator is an exhaust gas from the fuel cell.

8. The system according to claim 1, wherein the heat exchangers through which the refrigerant passes are changed between cooling operation and heating operation, the heat exchangers are changed by actuating changing means, in cooling operation, the refrigerant passes through the second condenser, the first condenser, and the first evaporator, while in heating operation, the refrigerant passes through the second condenser, the second evaporator, and the first evaporator.

9. The system according to claim 8, wherein the single decompressing means is an automated expansion valve, and the changing means is a three-way valve.

10. The system according to claim 8, wherein the second condenser comprises a pump to discharge a hot water, and a pipe in which the hot water circulates, and the pipe comprises a first heat exchanger to exchange heat with the refrigerant, and a second heat exchanger to exchange heat with the air for air-conditioning.

11. The system according to claim 8, wherein the fluid which exchanges heat with the refrigerant at the second evaporator is a coolant used in an engine.

12. The system according to claim 9, wherein an ejector is provided between the automated expansion valve and the three-way valve.

13. The system according to claim 12, wherein the fluid which exchanges heat with the refrigerant at the second evaporator is a coolant used in an engine.

14. The system according to claim 8, wherein the fluid which exchanges heat with the refrigerant at the second evaporator is a coolant used in a fuel cell.

* * * * *